United States Patent [19]
de Limur

[11] 4,076,848
[45] Feb. 28, 1978

[54] ENCAPSULATED PULVERIZED DEHYDRATED FRUIT AND VEGETABLE PRODUCT

[76] Inventor: Eleanor de Limur, 111 Sutter St., San Francisco, Calif. 94104

[21] Appl. No.: 668,106

[22] Filed: Mar. 18, 1976

[51] Int. Cl.² ............................................. A23B 7/02
[52] U.S. Cl. ..................................... 426/89; 206/528; 220/8
[58] Field of Search .................. 426/589, 89; 206/528; 220/8

[56] References Cited

U.S. PATENT DOCUMENTS

| | | | |
|---|---|---|---|
| 1,931,765 | 10/1933 | Leever | 220/8 |
| 3,285,408 | 11/1966 | Carnagli | 220/8 |
| 3,366,229 | 1/1968 | Sanni | 426/115 |
| 3,453,661 | 7/1969 | Repko | 426/115 |
| 3,620,759 | 11/1971 | Maddox | 426/589 |
| 3,664,495 | 5/1972 | Graham | 220/8 |
| 3,927,195 | 12/1975 | Messora | 220/8 |

*Primary Examiner*—Jeanette M. Hunter
*Attorney, Agent, or Firm*—Townsend and Townsend

[57] ABSTRACT

Edible encapsulated, dehydrated, pulverized fruits and/or vegetables as garnishes. Capsules containing volume of ingredients equivalent to cylinders 1 to 1½ inches long, ⅜–½ inch diameter, or such amounts as normally used in preparing meals for two to four persons. Openable/re-closeable capsule constructions are formed of two cylindrical capsule halves, with apertures in the cylindrical side walls thereof. The capsule halves are slideable moveably, one within the other, whereby the apertures may be aligned to provide an opening in the capsule, or moved out of alignment to close the capsule.

3 Claims, 10 Drawing Figures

U.S. Patent    Feb. 28, 1978    Sheet 1 of 2    4,076,848
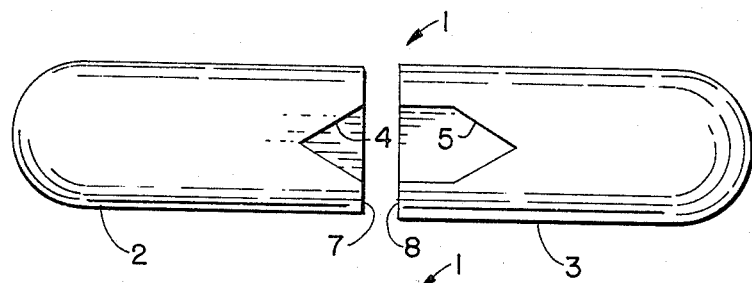
FIG._1A.
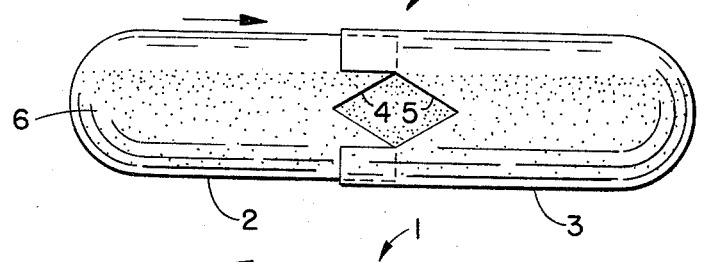
FIG._1B.
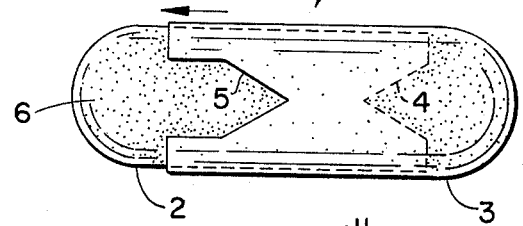
FIG._1C.
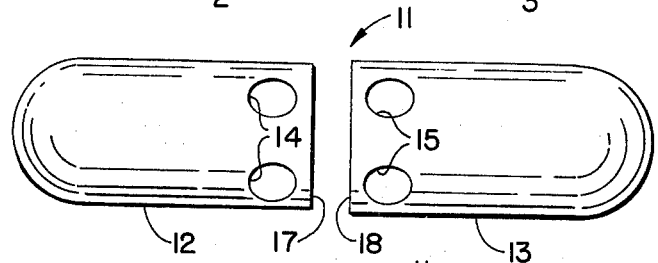
FIG._2A.
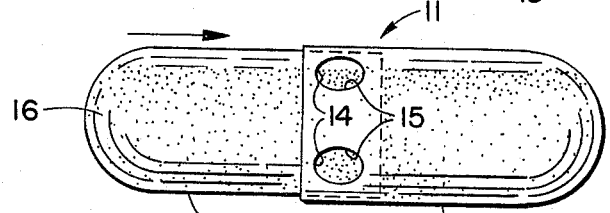
FIG._2B.
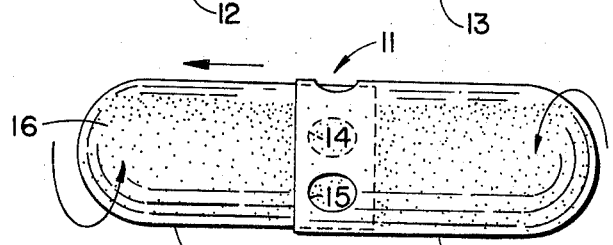
FIG._2C.
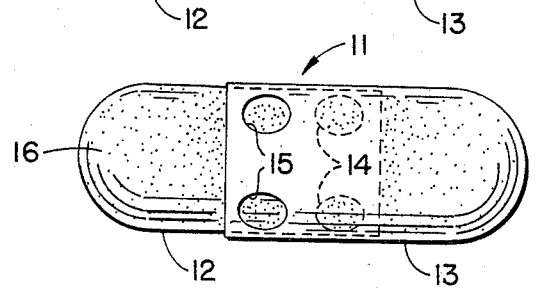
FIG._2D.

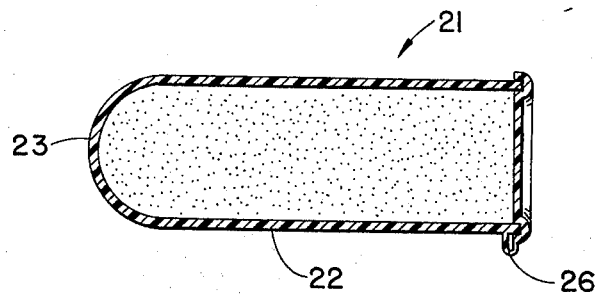
FIG._3A.
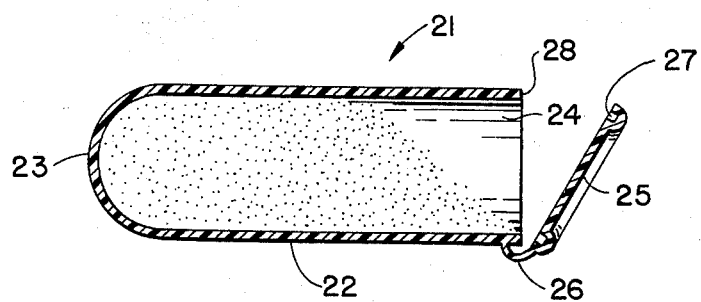
FIG._3B.
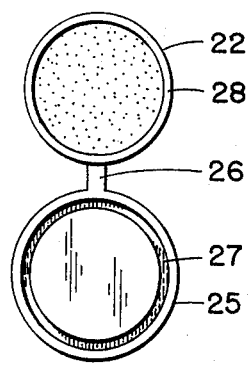
FIG._3C.

ENCAPSULATED PULVERIZED DEHYDRATED FRUIT AND VEGETABLE PRODUCT

BACKGROUND OF THE INVENTION

This invention relates to encapsulated pulverized dehydrated fruits and vegetables, particularly for use as a garnish in the preparation of foods; and, to novel openable/re-closeable capsule constructions for use with those and other particulate materials.

Various garnish preparations of pulverized dehydrated vegetables and fruits are known. In the past, such preparations have tended to lose flavor by exposure to air. For example, it is customary to package garnishes of the type described in containers holding relatively large quantities, far in excess of the amount normally used in any given meal.

The present invention is directed to packaging pulverized dehydrated vegetables and fruits in small capsules of gelatin or the like which seal the product against the atmosphere to maintain its freshness and prevent staleness. The capsule contains small amounts of the product in quantities customarily used in the preparation of meals for two to four persons. Typically, such capsules will be 1 - 1½ inches long and ⅜ - ½ inch diameter.

The capsule may be dropped whole into hot liquids, such as soups, in which event the capsule will dissolve; or the capsule may be opened and the contents sprinkled out, such as with cold or non-liquid dishes. To ensure maximum freshness, any small quantities not used when the capsule is first opened may be discarded without appreciable waste or cost in view of the small quantities involved.

In addition, the capsule may be specially constructed with one or more small apertures which are openable and reclosable. If less than the entire contents of a capsule are required, small and easily regulated portions may be sprinkled through the aperture(s). This capsule construction reduces the tendency for the entire capsule contents to spill out unintentionally and provides means whereby the capsule may be reclosed with minimal exposure to the atmosphere if the remaining contents are to be saved for later use. Such capsules may be of an edible liquid soluble material, such as gelatin, or they may be of nonedible, non-soluble materials, such as polyethylene or the like.

The garnish ingredients may consist of any composition of one or more pulverized, dehydrated vegetables and/or fruits, with or without other finely divided ingredients, such as sugar, for example.

The objects of the present invention are to overcome the aforementioned difficulties and provide the advantages herein described.

Numerous other objects and advantages of the invention will be apparent as is better understood from the following description of its preferred embodiments.

DESCRIPTION OF THE DRAWINGS

FIG. 1A is an elevation of the two halves of an openable/re-closeable capsule according to the present invention.

FIG. 1B is a elevation of the capsule of FIG. 1A, showing the capsule in the "open" condition, together with its contents.

FIG. 1C is an elevation of the capsule of FIG. 1B, showing the capsule in the "closed" condition.

FIG. 2A is an elevation of a second embodiment of an openable/re-closeable capsule according to the present invention, shown with its two halves separated and empty.

FIG. 2B is an elevation of the capsule of FIG. 2A, showing the capsule n its "open" condition, with contents.

FIG. 2C is an elevation of the capsule of FIG. 2A wherein it has been closed by rotation of the two halves, one within the other.

FIG. 2D is an elevation of the capsule of FIG. 2A wherein it has been partially emptied of its contents and closed by pressing one half into the other.

FIG. 3A is a sectional elevation of a third embodiment of an openable/re-closeable capsule according to the present invention, shown closed, with contents.

FIG. 3B is a sectional elevation of the capsule of FIG. 3A, shown open, with contents.

FIG. 3C is an end view of the open capsule with contents.

PREFERRED EMBODIMENTS

In preparing food products according to the present invention, most ingredients must be specially dehydrated, whereas others such as clove are commercially available in direct form. Those materials, such as fruits and vegetables which need be dehydrated are first finely chopped, then dehydrated by conventional methods, and then pulverized. Other ingredients may be pulverized directly, or first chopped and then pulverized. Once all ingredients have been pulverized, then are placed in the capsule in the proportions desired.

For example, a garnish for flavoring meats, soups, sauces, and stews, is prepared as follows: First, separately chop small quantities of celery tops, carrots, parsley, garlic, salt and pepper. Separately dehydrate these ingredients by heating in a covered pan for 20 - 30 minutes at 350° F. Then separately pulverize these ingredients, as well as one nail of clove, and on bay leaf. Combine the ingredients in proportion to the following amounts of pulverized material:

1 pinch celery tops
1 pinch carrots
1 pinch parsley
1 pinch garlic
1 nail clove
1 bay leaf The combined pulverized ingredients are then mixed thoroughly and placed into a gelatin capsule approximately 1 ½ inches long, ½ inch diameter. This particular encapsulated garnish, in these or other proportions, replaces what is known as a "Bouquet Garni," a combination of vegetable and spice ingredients used in preparing stews, meats, soups and sauces.

Except for omission of apertures 4, 5, 14 and 15, the basic capsule employed is the same as the type shown in the drawings in that it consists of two cylindrical halves, each open at one end, which are inserted telescopically one into the other, open ends facing, and pressed together from the ends. Excess air escapes along the sides of the capsule. If end-wise pressure is applied after most of the excess air escapes, the contents become slightly compressed so that when pressure at the ends of the capsule is released, the compressed contents tend to rebound slightly, tending to cause a partial vacuum in the capsule which, in turn, tends to hold the walls of the capsule halves together and thereby improve the airtightness of the capsule. Even without this vacuum forming effect, the capsule halves fit together closely and provide a hermetic seal.

The hermetic seal tends to protect the flavor and freshness of all ingredients, although particularly those ingredients which are fruits and vegetables, which are believed to give up freshness and flavor more readily than other ingredients such as clove, for example. However, most flavorful organic materials are believed to give up flavor more readily when pulverized owing to the relatively large surface to volume ratio of the particles.

The 1½ inches by ½ inch capsule holds sufficient garnish for approximately four servings of beef stew, soups, gravies or other similar dishes. Greater or lesser amounts of garnish may be used, according to taste and also according to the nature of the dish itself.

Generally we prefer capsules of about the size described although we have used smaller capsules, about 1 inch long, ⅜ inch diameter, which contain roughly one half as much as the larger 1½ inches by ½ inch capsules. Capsules much larger than these two sizes are generally undesirable since they contain more garnish than is normally used for a meal and tend to cause waste and/or loss of freshness. If greater amounts of garnish are required, it is preferred to use several small capsules, rather than a single large one. The general rule we follow in selecting capsule size is to use a capsule which holds sufficient garnish for 2 – 4 servings, since most meals are prepared in 2 – 4 serving quantities. When less than a full capsule is required, the proper amount to be emptied from the capsule can be easily gauged visually. This is particularly so, when using the non-edible polyethylene capsule shown in FIG. 3. If very large capsules were employed, such as might be sufficient for 10 or 20 servings, it would be relatively difficult to visually gauge the proper portion of such capsule to use fo a small number of servings.

The filled edible capsule may be dropped intact into liquid containing main dishes, such as stews and soups, during cooking; or it may be opened and the contents sprinkled out, as may be desired, especially where used on cold or non-liquid dishes, such as salads, or where used as decoration, or where less than the entire contents of the capsule are required.

The capsule may be of polyethylene or other nonedible materials, depending upon the ingredients contained therein and the purpose for which they are intended, in which case it must be emptied rather than added intact.

We have also prepared compositions of pulverized, dehydrated, parsley, garlic, onions, tarragon, all sorts of herbs, and even tea leaves, to which we have sometimes added flavoring such as clove, orange or lemon in various amounts. Likewise, we have prepared garnishes of dehydrated, pulverized fruits, such as orange and lemon, individually and in combination with other fruits and flavorings. Freeze dried coffee may also be enclosed in our capsules.

If desired, the capsule or the contents of the capsule may be enclosed in a strainer material, such as cheese cloth, paper, perforated metal, or wire mesh, thus preventing the ingredient particles from appearing in the serving. Capsules of tea, for example, may be beneficially held in a strainer to prevent tea particles from appearing in the tea cup.

We use the term "garnish" to apply broadly to all edibles encompassed by our invention, some being employed for flavor, some for decoration, and others for both decoration and flavor. We include tea under the term "garnish" since it is a flavoring.

We have devised novel openable/re-closeable capsules for use with the garnish ingredients of the present invention, or with other ingredients. Three alternative types of openable/reclosable capsules are shown in the drawings, FIGS. 1A–C, 2A–D and 3A–B.

The first embodiment is shown in FIGS. 1A–C and comprises a cylindrical capsule 1 consisting of two similar open-ended telescoping cylindrical halves 2 and 3. Each half 2, 3 bears a notch-like aperture or opening 4, 5, respectively, in its lip 7, 8. In operation, the dehydrated, pulverized material 6 is placed inside the capsule 1 and the open end of the smaller half 2 is inserted in customary telescope-fashion inside the larger half 3, as shown in FIG. 1B. To seal the ingredients 6 from the atmosphere, the halves 2 and 3 are pressed together tightly from the ends to drive excess air out of the capsule 1. When one desires to use the contents of the capsule, if it is constructed of a gelatin or other edible dissolvable material, the entire capsule may be placed in the cooking pot. Alternatively, the capsule halves 2 and 3 may be withdrawn, one from the other and the notches 4 and 5 aligned to form an opening 4, 5 as shown in FIG. 1B. The capsule contents may be sprinkled out of this opening. If less than the entire contents are used, the capsule can be reclosed by simply applying endwise pressure as before.

The second embodiment of capsule 11, according to the present invention, is shown in FIGS. 2A through 2D and consists of similar capsule halves 12, 13, each of which contains two apertures 14, 15, respectively. Apertures 14 and 15 are formed near the lips 17 and 18, respectively. In operation, food ingredients 16 are placed in the capsule halves 12 and 13 which are inserted one into the other, as shown in FIG. 2B. When holes 14 and 15 are aligned, the contents 16 may be emptied therethrough. When the apertures 14 and 15 are out of alignment, as shown in FIGS. 2C and 2D, the capsule is closed and forms a hermetic seal. The capsule 11 may be opened and closed, either by rotating the capsule halves 12 and 13 in opposite directions as shown in FIG. 2C which results in radial misalignment of the apertures 14 and 15; or by pressing the interior capsule half 12 into the exterior capsule half 13 causing axial misalignment of the apertures 14 and 15, as shown in FIG. 2D.

The capsule embodiments of FIGS. 1A–C and 2A–D are referred to herein as "openable/re-closeable" capsules. As used herein, with reference to cylindrical capsules consisting of two separate cylindrical sections, the term means a capsule which can be opened to discharge its contents without completely separating the sections. It is recognized that conventional cylindrical gelatin capsules may be opened and re-closed by wholly separating and rejoining the sections, but such is relatively difficult and is not contemplated by the present invention.

Thus, when the capsule 11 contains a full load of pulverized material 16, all air is driven out when the interior half 12 is only partially inserted into the exterior half 13 as shown in FIG. C. Once the capsule has been partially emptied, the interior half 12 may be inserted further into the exterior half 13 to drive out air occupying the space formally occupied by the material 16 that has been removed. Accordingly, the capsule may be substantially evacuated of air even after it has been partially emptied, thereby continuing to preserve the freshness of the unused portion of its contents for later use.

The third capsule embodiment according to the present invention is shown in FIGS. 3A and 3B, comprised of a one-piece capsule 21 having a hollow cylindrical container or body portion 22, a bottom portion 23, an open end 24 defined by a circular lip portion 28 and a cap portion 25 attached to the open end 24 of the body portion 22 by means of an integrally, formed flexible tab 26. The cap portion 25 is generally flat and circular, with an annular groove 27 in its periphery which, when the cap is closed, mates with the circular lip 28 of the body portion 22, as shown in FIG. 3A to form a hermetic seal. The capsule is of a flexible polymeric material, preferably polyethylene.

While the invention has been described with reference to the structure disclosed herein, it is not confined to the details set forth, and this application is intended to cover such modifications or changes as may come within the scope of the following claims.

I claim:

1. A food article comprising a hollow capsule having an interior cavity, said cavity having a volume approximately 1 to 1½ inches long and ⅜ to ½ inch diameter; said cavity filled with a quantity of dehydrated, pulverized fruit and/or vegetable edible matter, hermetically sealed therein, said capsule being formed of a flexible polymeric material and consisting of a hollow cylindrical body portion closed at one end, with an opening at the other end defined by a circular lip portion, a circular cap portion attached to said body portion at said lip portion by a flexible integrally formed tab, said cap portion having an annular groove at its periphery which mates with said circular lip portion when said cap portion is placed across said opening to provide a hermetic seal.

2. A food article as recited in claim 1 wherein said capsule is of a water-soluble material.

3. A food article as recited in claim 1 wherein said capsule is of a material which is non water-soluble.

* * * * *